United States Patent [19]
Maxson et al.

[11] 3,951,824
[45] Apr. 20, 1976

[54] DRY DRILLING FLUID COMPOSITION

[75] Inventors: Orwin G. Maxson, Ponca City, Okla.; George M. Myers, Houston, Tex.; Jaime A. Lescarboura, Ponca City, Okla.

[73] Assignee: Continental Oil Company, Ponca City, Okla.

[22] Filed: Feb. 12, 1973

[21] Appl. No.: 331,429

[52] U.S. Cl............................ 252/8.5 B; 252/313 S; 166/275
[51] Int. Cl.²......................................... E21B 43/16
[58] Field of Search.................. 252/8.5 B, 313 S; 166/275

[56] References Cited
UNITED STATES PATENTS

| | | | |
|---|---|---|---|
| 1,873,296 | 8/1932 | Cross | 252/8.5 B |
| 2,434,674 | 1/1948 | Pincus | 252/8.5 B |
| 2,455,188 | 11/1948 | Oxford | 252/8.5 B |
| 3,153,450 | 10/1964 | Foster et al. | 252/8.55 |
| 3,393,155 | 7/1968 | Schutte et al. | 252/316 |

FOREIGN PATENTS OR APPLICATIONS

| | | | |
|---|---|---|---|
| 713,211 | 8/1954 | United Kingdom | 252/313 S |

*Primary Examiner*—Leland A. Sebastian
*Assistant Examiner*—B. H. Hunt
*Attorney, Agent, or Firm*—Richard W. Collins

[57] ABSTRACT

A dry powdered drilling fluid composition and method of use thereof prepared by mixing together under conditions of high shear a major portion of water and a minor portion of a hydrophobic silica.

2 Claims, No Drawings

DRY DRILLING FLUID COMPOSITION

BACKGROUND OF THE INVENTION

1. Field of the Invention

The present application relates to a drilling fluid composition and method of use thereof in drilling subterranean wells. More particularly, the application relates to such a fluid which is flowable but non-liquid, i.e., is dry.

2. Description of the Prior Art

In drilling wells in the earth it has long been the practice to employ a drill bit or similar device to drill a bore hole and to circulate past the drilling apparatus a drilling fluid to cool the drilling apparatus, lift cuttings out of the hole, and counterbalance the subterranean formation pressure encountered. A wide variety of drilling fluids have been used including aqueous base liquids, hydrocarbon base liquids, air or other gases, mists, foams, and the like. For many drilling applications, present-day drilling fluids are inadequate. For example, in some instances it is desirable to use a drilling fluid low in density. If a drilling fluid having the density of an aqueous liquid or a hydrocarbon base liquid is used, some formations being drilled are so friable and fragile that they will undesirably fracture under the weight of the column of drilling fluid. This can result in loss of the column of drilling fluid to the formation, loss of circulation, and disruption of the drilling operation. Known lighter density drilling fluids such as air, mist and foams are often too compressible, unstable, or have too high a fluid loss to be entirely acceptable. In other instances, especially in drilling wells which will produce gas, known drilling fluids often tend to at least partially penetrate the formation during drilling resulting in plugging of a sharp reduction in permeability of the formation through which the formation fluids will eventually be withdrawn. Thus, there is needed a low density, stable drilling fluid with a low fluid loss which causes a minimum of formation damage.

OBJECTS OF THE INVENTION

It is an object of this invention to provide a low density, stable drilling fluid composition which causes a minimum of formation damage and a method of use of such a composition. It is a further object to provide such a drilling fluid composition which is flowable but dry.

It is a still further object to provide such a drilling fluid composition which will not leak water or other liquid to the formation.

Other objects, advantages, and features of the invention will be apparent from the following description and appended claims.

SUMMARY OF THE INVENTION

The drilling fluid composition of the instant invention is prepared by combining a hydrophobic silicon dioxide and water under conditions of high shear to form a flowable, dry, powdered, solid product. The composition can be used by circulating it down the bore hole of a well being drilled past the drill bit and back out of the bore hole. Any cuttings, liquid or other material picked up by the drilling fluid in its passage through the well bore can be removed at the surface and the drilling fluid recirculated into the well bore.

DESCRIPTION OF THE PREFERRED EMBODIMENTS

The drilling fluid composition of this invention is a mixture of a hydrophobic silicon dioxide and water. Hydrophobic silicon dioxide is made from a form of amorphous silica, such as silica gel, precipitated silica or fumed silica by well-known treatments with silanes or polysiloxanes. Amorphous silicas are substantially dehydrated polymerized silica which may be considered as condensation polymers of silicic acid. Silica gel can be made by acidifying a soluble silicate solution, such as aqueous sodium silicate, to produce a hydrosol which forms a hydrogel. The hydrogel is washed to free it of electrolytes and dried to such an extent that the resulting gel is essentially free of water. Precipitated silica is formed by the destabilization of soluble silicates such as aqueous sodium silicate solution, usually by acid neutralization with a mineral acid such as hydrochloric acid. The destabilization is carried out in a solution which also contains polymerization inhibitors, such as inorganic salts, which cause an extremely fine precipitate of hydrated silica to be formed. This precipitate is filtered, washed essentially free of occluded salts and dried. Fumed silica, also called pyrogenic silica, can be formed by any of several well-known processes. Some processes depend on volatilizing and recondensing silica, others on reacting silicon tetrachloride with hydrogen and oxygen. In one high temperature arc process silica is used as part of the electrodes. The silica is vaporized and recondenses as a fine silica dust. In another process, crystalline silica such as sand is fed directly to a high temperature plasma jet where the finely divided fumed silica is formed. In still another process, the flame-hydrolysis process, silicon tetrachloride is reacted with hydrogen and oxygen in a flame to form a very finely divided silica plus hydrochloric acid. The hydrochloric acid can be removed by washing as with water or an alcohol in which the acid is soluble. Siloxanes are ether-like compounds made by hydrolyzing a silane.

The drilling fluid of this invention is prepared by mixing together from about 2 to about 10 percent by weight hydrophobic silica with from about 98 to about 90 percent by weight water. Either fresh water or an oil field brine may be used. If less than about 2 percent hydrophobic silica is used, the resulting product is not completely dry, i.e., contains water as a separate phase. More than about 10 percent hydrophobic silica can be used but is not necessary and merely unnecessarily increases the cost of the mixture. The mixing is carried out under conditions of high shear. In the laboratory, a high speed blender or a dispersator can be used. In the field a rotating bladed stirrer, blender or any other mixer capable of imparting high shear to the mixture may be used. Mixing is easy to achieve and a mixing time of only five seconds is adequate for small batches. In large batches, a mixing time of up to 1 minute is satisfactory.

A drilling fluid composition was prepared by mixing together 95 parts by weight water and 5 parts by weight hydrophobic silica made from fumedsilica and silane. The hydrophobic silica had a surface area of 225 square meters per gram, a primary particle size of 7 m$\mu$, a bulk density of 3 pounds per cubic foot, a pH of from 8 to 10 and a specific gravity of 2.2. Mixing was carried out in a high-speed blender for five second. The resulting product was dry and powdered in appearance.

The density was 0.345 grams per cubic centimeter or 2.9 pounds per gallon. This is relatively light for a drilling fluid and would enhance penetration of the drill bit during drilling. The product was pumpable and had a high lubricity. The apparent viscosity was 40 centipoises. This relatively high viscosity enabled the drilling fluid to satisfactorily support cuttings and remove the cuttings from the well bore when circulated past the drill bit during drilling operations. The fluid loss of this drilling fluid was determined at room temperature according to the procedures of API RP13B. The fluid loss was 8 cc in 30 minutes. There was no filter cake buildup on the filtration medium. The absence of a filter cake is indicative that the instant drilling fluid would have relatively little formation damage compared to commonly used aqueous base or hydrocarbon base drilling fluids.

The foregoing discussion and description have been made in connection with preferred specific embodiments of the composition and process. However, it is to be understood that the discussion and description of the invention is only intended to illustrate and teach those skilled in the art how to practice the invention and is not to unduly limit the scope of the invention which is defined and claimed hereafter.

We claim:

1. A method of drilling a well comprising circulating in the well, during drilling, a dry drilling composition consisting essentially of from 98–90 parts by weight water and from 2–10 parts by weight of hydrophobic silica particles.

2. The method of claim 1 wherein said particles have a primary particle size of 7 millimicrons.

* * * * *